United States Patent

(12) United States Patent
Ito

(10) Patent No.: US 10,142,558 B2
(45) Date of Patent: Nov. 27, 2018

(54) ADAPTOR AND CAMERA SYSTEM

(71) Applicant: CANON KABUSHIKI KAISHA, Tokyo (JP)

(72) Inventor: Shu Ito, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/482,979

(22) Filed: Apr. 10, 2017

(65) Prior Publication Data
US 2017/0295307 A1 Oct. 12, 2017

(30) Foreign Application Priority Data

Apr. 12, 2016 (JP) .................................. 2016-079396
Mar. 3, 2017 (JP) .................................. 2017-040987

(51) Int. Cl.
*H04N 5/238* (2006.01)
*H04N 5/232* (2006.01)
*H04N 5/235* (2006.01)
*H04N 5/225* (2006.01)

(52) U.S. Cl.
CPC ........... *H04N 5/238* (2013.01); *H04N 5/2254* (2013.01); *H04N 5/2351* (2013.01); *H04N 5/23209* (2013.01); *H04N 5/23245* (2013.01)

(58) Field of Classification Search
CPC ...... G03B 11/00; H04N 5/238; H04N 5/2254; H04N 5/23245
See application file for complete search history.

(56) References Cited

U.S. PATENT DOCUMENTS

| 6,930,723 | B1 * | 8/2005 | Tsuda ..................... H04N 5/238 348/360 |
| 2002/0071048 | A1 * | 6/2002 | Kaneda .............. H04N 5/23209 348/363 |
| 2004/0027479 | A1 * | 2/2004 | Ikeda ................. H04N 5/23232 348/363 |

(Continued)

FOREIGN PATENT DOCUMENTS

| JP | 2007243928 A | 9/2007 |
| JP | 2008242230 A | 10/2008 |

(Continued)

Primary Examiner — Ahmed A Berhan
(74) Attorney, Agent, or Firm — Rossi, Kimms & McDowell LLP

(57) ABSTRACT

An adaptor is attachable between an interchangeable lens including a first light amount adjustment unit capable of changing a passing area of image pickup light, and a camera main body including an image pickup element. The adaptor includes: a second light amount adjustment unit capable of changing transmittance of the image pickup light by using a change in a physical property; and a controller controlling the second light amount adjustment unit. In image pickup mode, the controller controls the transmittance in the second light amount adjustment unit depending on an operating amount of an operation unit by a user to adjust a light amount, and in the image pickup mode, the controller converts an instruction, transmitted toward the interchangeable lens from the camera main body, to drive the first light amount adjustment unit, into a drive completion signal, and transmits the drive completion signal to the camera main body.

14 Claims, 13 Drawing Sheets

(56) References Cited

U.S. PATENT DOCUMENTS

2014/0300805 A1* 10/2014 Davis .................... H04N 5/238
                                                        348/362

FOREIGN PATENT DOCUMENTS

| JP | 2010204303 A | 9/2010 |
| JP | 2014182293 A | 9/2014 |
| JP | 2014236243 A | 12/2014 |

* cited by examiner

ADAPTOR AND CAMERA SYSTEM

BACKGROUND OF THE INVENTION

Field of the Invention

The present invention relates to an adaptor and a camera system both including a light amount adjustment unit capable of changing transmittance of image pickup light by using a change in a physical property.

Description of the Related Art

An adaptor is conventionally used to connect an interchangeable lens to a camera main body when the mount form of the interchangeable lens is different from that of the camera main body. Examples of reasons for the difference in the mount form include a difference in an image size and a difference in a flange back.

In recent years, smaller and lighter mirrorless single-lens cameras, as single-lens reflex cameras without a mirror unit, have become widely in use. The flange backs of the mirrorless single-lens cameras are designed shorter than those of the single-lens reflex cameras, and the mirrorless single-lens cameras are different in mount form from the single-lens reflex cameras.

Without having a mirror unit, the mirrorless single-lens cameras are optimized for contrast autofocus, and are more suitable for picking up moving images than the single-lens reflex cameras using both contrast autofocus and phase difference autofocus. Based on this background, with a wide use of the mirrorless single-lens cameras, there has been an increasing demand to pickup moving images using a digital camera.

Meanwhile, a stop configured to change the area of the aperture through which light passes is essential for an interchangeable lens from the viewpoint of adjusting an amount of light incident on the interchangeable lens (an amount of image pickup light). A mechanical stop using a stepping motor or the like as a driving source is often used as the stop. However, the mechanical stop causes driving noise because of its structure. This raises a problem that the driving noise is also recorded in moving image pickup with sound recording.

Another method of adjusting the amount of incident light is to insert and retract an ND filter. The use of the ND filter makes it possible to adjust the amount of incident light without driving the mechanical stop.

Japanese Patent Application Laid-Open No. 2014-182293 discloses a lens adaptor (adaptor) which is attached between an image pickup lens and a camera main body, and which includes a mechanism for inserting and retracting a filter onto or from an optical path.

Furthermore, Japanese Patent Application Laid-Open No. 2010-204303 discloses a lens adaptor including an ND filter which is inserted at a controlled position. A stop in an interchangeable lens and the ND filter in the lens adaptor are controlled depending on exposure information.

However, the lens adaptors described in Japanese Patent Application Laid-Open Nos. 2014-182293 and 2010-204303 each include the mechanism for inserting and retracting the ND filter therein, and have a problem that driving noise occurs when the ND filter is inserted and retracted.

SUMMARY OF THE INVENTION

An object of the present invention is to provide an adaptor and a camera system which are capable of adjusting an amount of light silently.

For the purpose of achieving the object described above, an adaptor according to the present invention is attachable between an interchangeable lens and a camera main body. The interchangeable lens includes a first light amount adjustment unit capable of changing a passing area of image pickup light. The camera main body includes an image pickup element. The adaptor includes: a second light amount adjustment unit capable of changing transmittance of the image pickup light by using a change in a physical property; and a controller configured to control the second light amount adjustment unit. In a first image pickup mode for performing a first still image pickup, the controller controls the transmittance in the second light amount adjustment unit depending on an operating amount of an operation unit for a user to adjust an amount of light, and in the image pickup mode, the controller converts an instruction, transmitted toward the interchangeable lens from the camera main body, to drive the first light amount adjustment unit, into a drive completion signal, and transmits the drive completion signal to the camera main body.

In addition, a camera system according to the present invention includes the adaptor.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment (Camera System)

Figure 1:
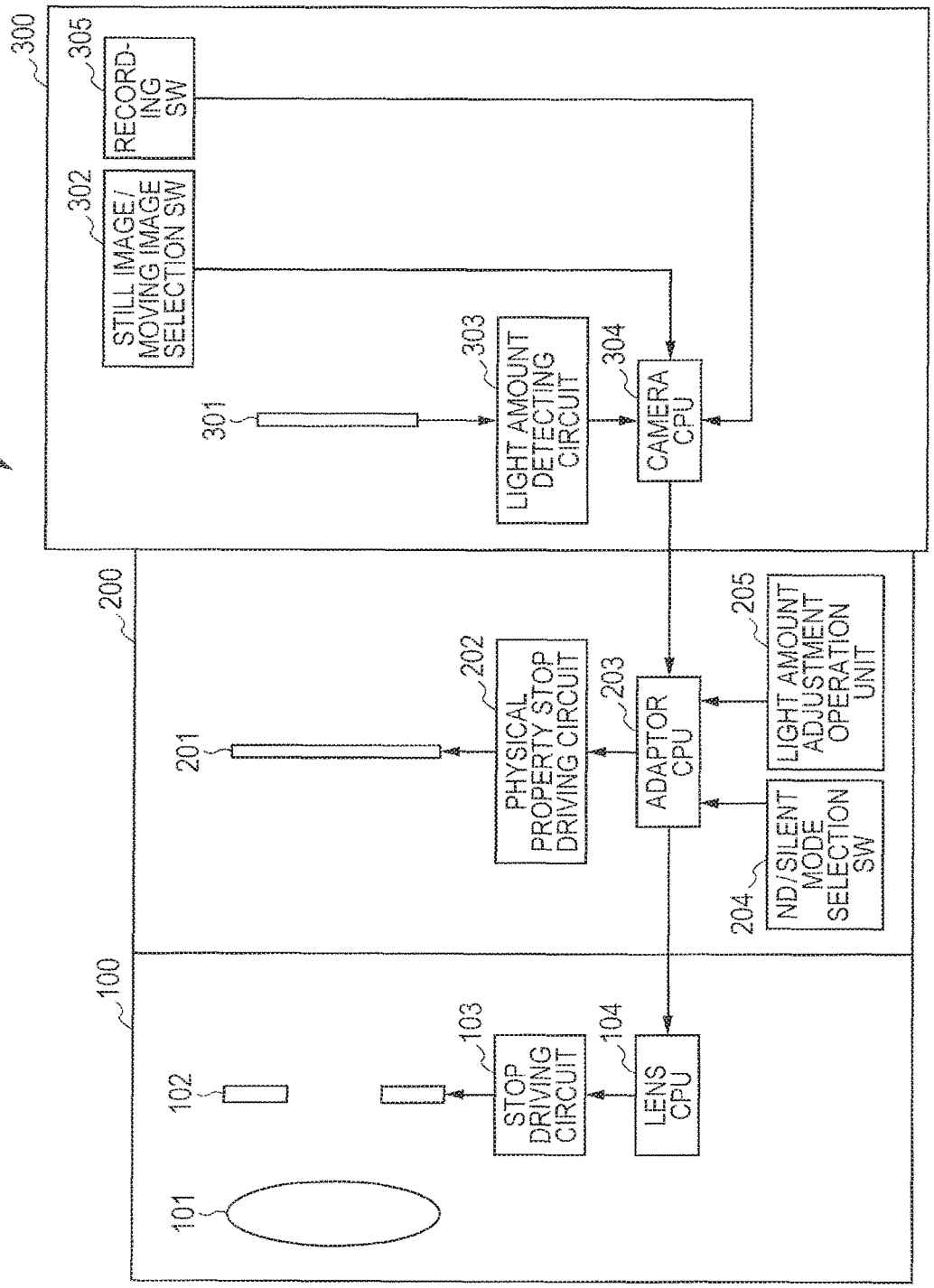
FIG. 1 is a schematic diagram of a camera system including an adaptor of a first embodiment.

FIG. 1 is a schematic diagram of a camera system including an adaptor of a first embodiment of the present invention. The camera system 1 includes an interchangeable lens 100, a camera main body 300, as well as an adaptor 200 attachable between the interchangeable lens 100 and the camera main body 300.

An image pickup lens 101, a mechanical stop 102 and a lens CPU 104 are provided in the interchangeable lens 100. The mechanical stop 102 serves as a first light amount adjustment unit, and is capable of changing the area of an aperture which allows image pickup light to pass through (the aperture diameter corresponding to the area of the aperture through which light passes). The lens CPU 104 controls the mechanical stop 102 using a stop driving circuit 103. Thereby, the interchangeable lens 100 is capable of communicating with the camera main body 300 and the adaptor 200.

A microcomputer in the interchangeable lens 100 includes the lens CPU 104 and a memory (not illustrated), for example. Information regarding the interchangeable lens 100 (for example, a focal length, brightness, a range within which the aperture diameter of the stop is variable) is stored in the memory in advance.

In this respect, the adaptor 200 includes: a physical property stop (material stop) 201 serving as a second light amount adjustment unit, and being capable of changing the transmittance of the image-pickup light based on a change in the physical property; a physical property stop driving circuit 202; an adaptor CPU 203; an ND/silent mode selection switch (SW) 204; and a light amount adjustment operation unit 205.

In the embodiment, the physical property stop 201 is formed from an electrochromic device which changes the light transmittance on application of a voltage. The physical property stop 201 may be formed from a liquid crystal element instead of the electrochromic device. The ND/silent mode selection switch 204 is formed from a slide switch or the like. Using the ND/silent mode selection switch 204, the image pickup mode can be switched between a first image pickup mode (ND mode) for performing a first still image pickup and a second image pickup mode (silent mode) for performing a second still image pickup.

In this respect, the ND mode is a still image pickup mode which allows the user to change the mechanical stop by operating the operation unit for the purpose of determining the depth of field, and which, once the mechanical stop is fixed, adjusts the amount of light by applying a voltage to the physical property stop depending on the operating amount of the operation unit by the user. Meanwhile, the silent mode is a still image pickup mode which adjusts the amount of light by applying a voltage to the physical property stop depending on the amount of light detected by a light amount detector on the assumption that the user does not operate the operation unit.

The light amount adjustment operation unit 205 is, for example, a ring-shaped unit provided to the outer peripheral part of the adaptor 200. The user can adjust the amount of light depending on the amount of turn of the light amount adjustment operation unit 205 when the user rotationally operates the light amount adjustment operation unit 205.

The camera main body 300 includes an image pickup element 301, a still image/moving image selection switch (SW) 302, a light amount detecting circuit 303, a camera CPU 304, and a recording switch (SW) 305. The still image/moving image selection switch 302 is a switch (SW) for the user to choose (switch) the image pickup mode between the still image mode and the moving image mode. The still image/moving image selection switch 302 is formed from a selection switch such as a dial switch. The recording switch 305 is formed from a push button or the like. While the image pickup mode is set at a third image pickup mode (moving image pickup mode) for performing a moving image pickup, the user can turn on and off the recording using the recording switch 305.

In the camera system of the embodiment, an object is captured by the image pickup lens 101; through the image pickup lens 101, the mechanical stop 102 with the variable aperture, and the physical property stop 201 in the adaptor 200; and eventually, the image of the object is formed on the image pickup element 301 in the camera main body 300. The camera system of the embodiment picks up a still image or a moving image using an output signal from the image pickup element 301.

The mechanical stop 102 in the interchangeable lens 100, and the physical property stop 201 in the adaptor 201 are the light amount adjustment units included in the camera system of the embodiment.

Figure 2:
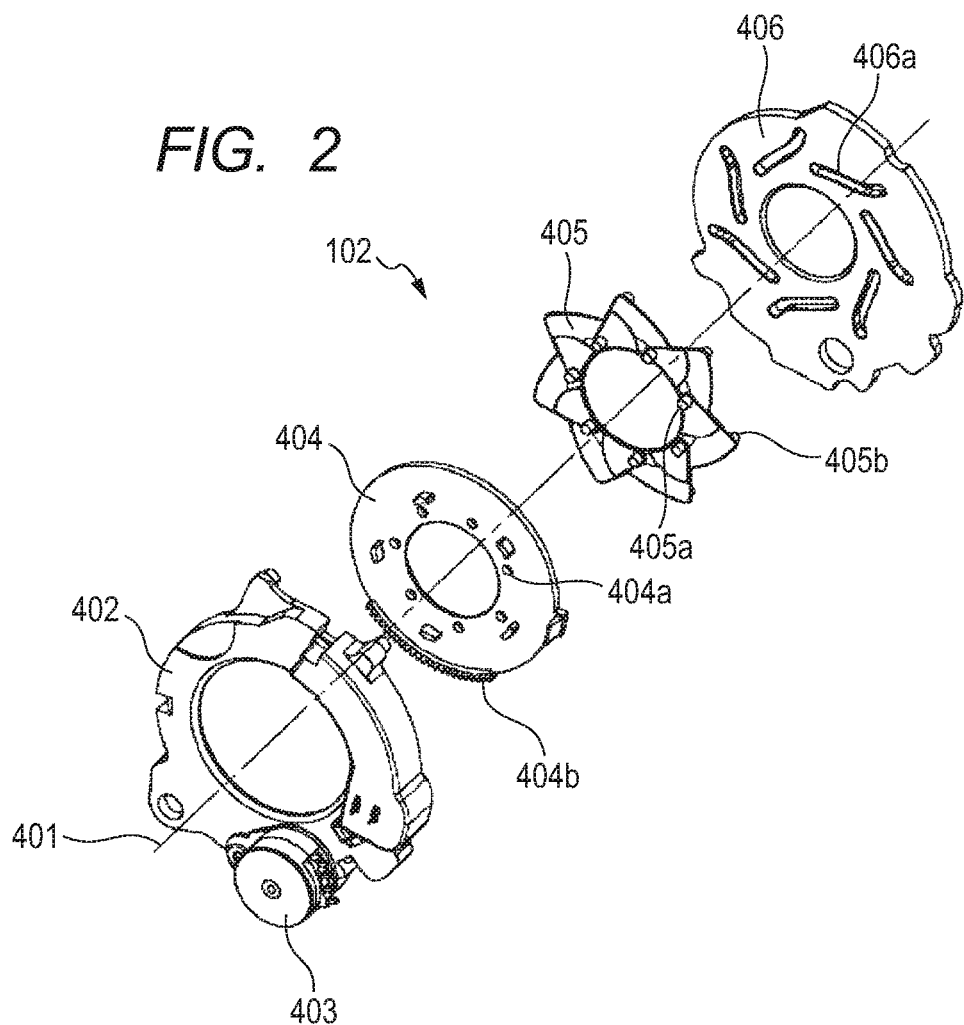
FIG. 2 is a perspective view illustrating a configuration of a mechanical stop included in an interchangeable lens.

Next, FIG. 2 is a perspective exploded view of the mechanical stop 102. The mechanical stop 102 includes a plurality of stop blades 405 which form a stop aperture. The plurality of stop blades 405 are displaced in a direction intersecting an optical axis 401. The displacement enables the area of the stop aperture to be adjusted. Thereby, the amount of light which is incident on the interchangeable lens through the image pickup lens 101 can be adjusted after the light passes through the mechanical stop 102.

The stop blades 405 include pin portions 405a, 405b. The pin portions 405a are inserted in hole portions 404a formed in a turnable plate 404. The pin portions 405b are slidably inserted in cams 406a formed in a cam plate 406. The turnable plate 404 is turnably fitted to a circular opening portion formed in a base plate 402. The turnable plate 404 includes a gear portion 404b.

A stepping motor 403 is fixed to the base plate 402. A gear (not illustrated) is attached to an output shaft of the stepping motor 403. Revolutions of the output shaft of the stepping motor 403 are transmitted to the turnable plate 404 via the gear and the gear portion 404b. Thereby, the turnable plate 404 turns around the optical axis 401. Once the turnable plate 404 turns, the stop blades 405 slide along the cams 406a. Thus, the area of the stop aperture is adjusted. Incidentally, for the structural reason, the mechanical stop 102 causes driving noise while the mechanical stop 102 is being driven. This poses a problem that the driving noise is recorded while moving images are being picked up.

Figure 3:
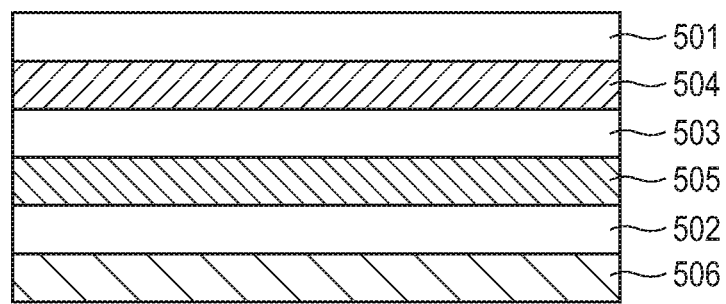
FIG. 3 is a schematic diagram illustrating a configuration of a physical property stop included in the adaptor.

Next, FIG. 3 illustrates a configuration of the physical property stop 201. The physical property stop 201 includes: a glass substrate 506; and two transparent electrode layers 501, 502, an insulating layer 503, a first color developing layer 504 and a second color developing layer 505 which are formed on the glass substrate 506. The transparent electrode layers 501, 502 serve each as a covering layer. The insulating layer 503 is a $Ta_2O_5$ layer, a $SiO_2$ layer or the like, and placed between the transparent electrode layers 501, 502. The first color developing layer 504 is an $Ir(OH)_x$, a $Ni(OH)_x$ or the like. The second color developing layer 505 is a $WO_3$ layer, a $MoO_3$ layer or the like. The first color developing layer 504 and the second color developing layer 505 are stacked with the insulating layer 503 interposed in between.

Once a voltage is applied between the transparent electrode layers 501, 502, the two color developing layers 504, 505 simultaneously develop colors, and change their colors variously. Thereby, the light transmittance property changes. The color generation is determined depending on the amount of electric charges supplied from the power supply to the electrodes. Once the voltage gets into equilibrium, the electric current does not flow any longer. For this reason, the circuit seemingly functions as a capacitor.

Even if the power supply is removed, the physical property stop 201 retains the above state unless the electric charges transfer to the outside. Accordingly, the electrochromic element itself has a function as a memory. The memory retention time is substantially determined by the leak to the external circuit. Even if left as it is, the physical property stop 201 can retain the above state for more than 10 hours. For this reason, no memory is needed for the regular use purpose. Meanwhile, the decolorization can be achieved by removing the supplied electric charges. To this end, a resistance is connected to, or a reverse voltage is applied to the electrochromic device. Since the physical property stop 201 changes the light transmittance based on the change of the physical property according to the application of a voltage, the physical property stop 201 causes no driving noise.

Descriptions will be hereinbelow provided for the ND mode, the silent mode and the moving image mode in this order. Incidentally, in the camera system of the embodiment, the camera main body 300 is not capable of recognizing the ND mode or the silent mode (the camera main body 300 does not include the ND/silent mode selection switch 204.

1a) ND Mode (ND Image Pickup Mode)

Figure 4:
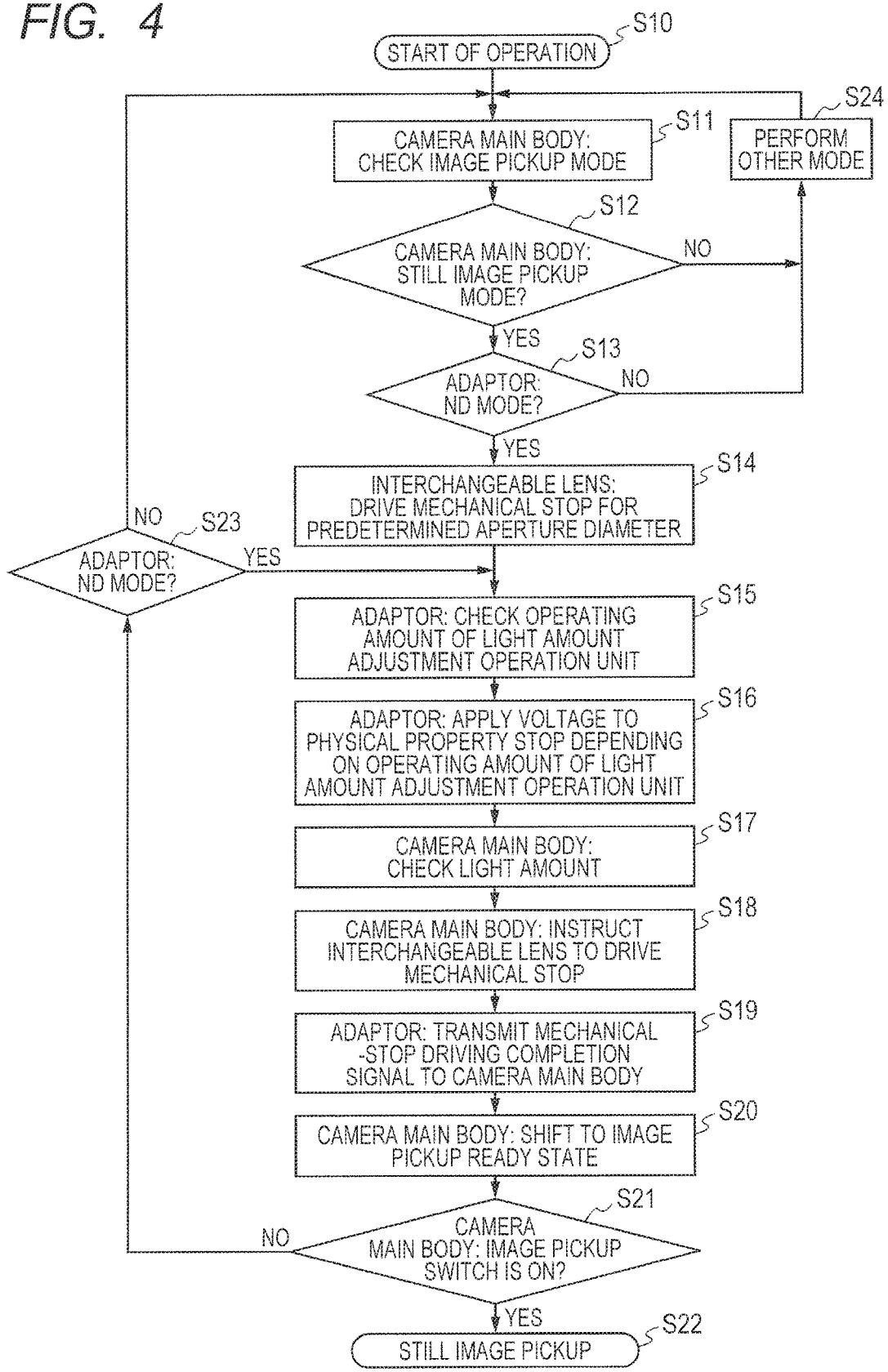
FIG. 4 is a flowchart of how the camera system of the first embodiment works to adjust an amount of light in an ND mode.

FIG. 4 illustrates a flow of how the camera system operates when the ND mode is selected using the ND/silent mode selection switch 204 in the adaptor 200.

First of all, as shown in step (in the drawing, step is denoted by S) S10, operations of the interchangeable lens 100, the adaptor 200 and the camera main body 300 start. In step S11, the image pickup mode set in the camera main body 300 is checked. Thereafter, in step S12, it is confirmed whether the image pickup mode is the still image pickup mode. If the image pickup mode is not the still image pickup mode, the other mode is performed in step S24. If the image pickup mode is the still image pickup mode, the operation flow proceeds to step S13, where it is confirmed whether the ND mode is selected in the adaptor 200. If the ND mode is not selected, the other mode is performed in step S24.

If the ND mode is selected, the operation flow proceeds to step S14, where the mechanical stop 102 in the interchangeable lens 100 is driven at a predetermined aperture diameter. The predetermined aperture diameter is obtained by adding or subtracting predetermined steps (or no steps) to or from an aperture diameter corresponding to the f-number set in the camera main body 300.

Thereafter, in step S15, the operating amount of the light amount adjustment operation unit 205 included in the adaptor 200 is detected (examined, checked). Then, in step S16, depending on the operating amount detected in step S15, a voltage to be applied to the physical property stop 201 is calculated in the adaptor CPU 203, and the voltage is applied to the physical property stop 201 based on the result of the calculation.

After that, in step S17, the amount of light which is incident on the image pickup element 301 is checked in the camera main body 300. In step S18, based on the amount of light checked in S17, an instruction to drive the mechanical stop 102 is transmitted from the camera main body 300 to the interchangeable lens 100 (but the mechanical stop 102 is not driven). The reason why the mechanical stop 102 is not driven is that there is a step as follows.

To put it specifically, the operation flow includes step S19 in which a false signal (completion signal) indicating the completion of the drive of the mechanical stop 102 is transmitted from the adaptor 200 to the camera main body 300. This step is achieved by: converting the instruction to drive the mechanical stop 102 into the drive completion signal; and transmitting the drive completion signal to the camera main body 300. Thus, the mechanical stop 102 is actually not driven based on the signal from the camera main body 300.

Step S19 is provided since in the embodiment, the camera main body is not capable of recognizing the ND mode or the silent mode (the camera main body does not include the ND/silent mode selection switch).

Next, in step S20, the camera main body shifts to an image pickup ready state. In step S21, it is checked whether the image pickup switch is ON or OFF. If the image pickup switch is ON, a still image pickup is performed. If the image pickup switch is OFF, it is checked again whether the image pickup mode is the ND mode in step S23. If the image pickup mode is not the ND mode, the operation flow proceeds to step S11. If the image pickup mode is the ND mode, the operation flow proceeds to step S15.

Once the ND mode is selected in the adaptor 200 through the above-discussed operation flow, to begin with, the user controls the mechanical stop 102 in the interchangeable lens 100 to make the mechanical stop 102 have a predetermined aperture diameter for the purpose of determining the depth of field. Thereafter, the adaptor CPU 203 serving as the controller controls the physical property stop 201 depending on the operating amount of the light amount adjustment operation unit 205 included in the adaptor 200.

When the ND mode is selected in the adaptor 200, the light amount can be adjusted with the aperture diameter of the mechanical stop 102 in the interchangeable lens 100 fixed. This makes it possible to adjust the light amount without changing the depth of field when an image is picked up.

Figure 11:
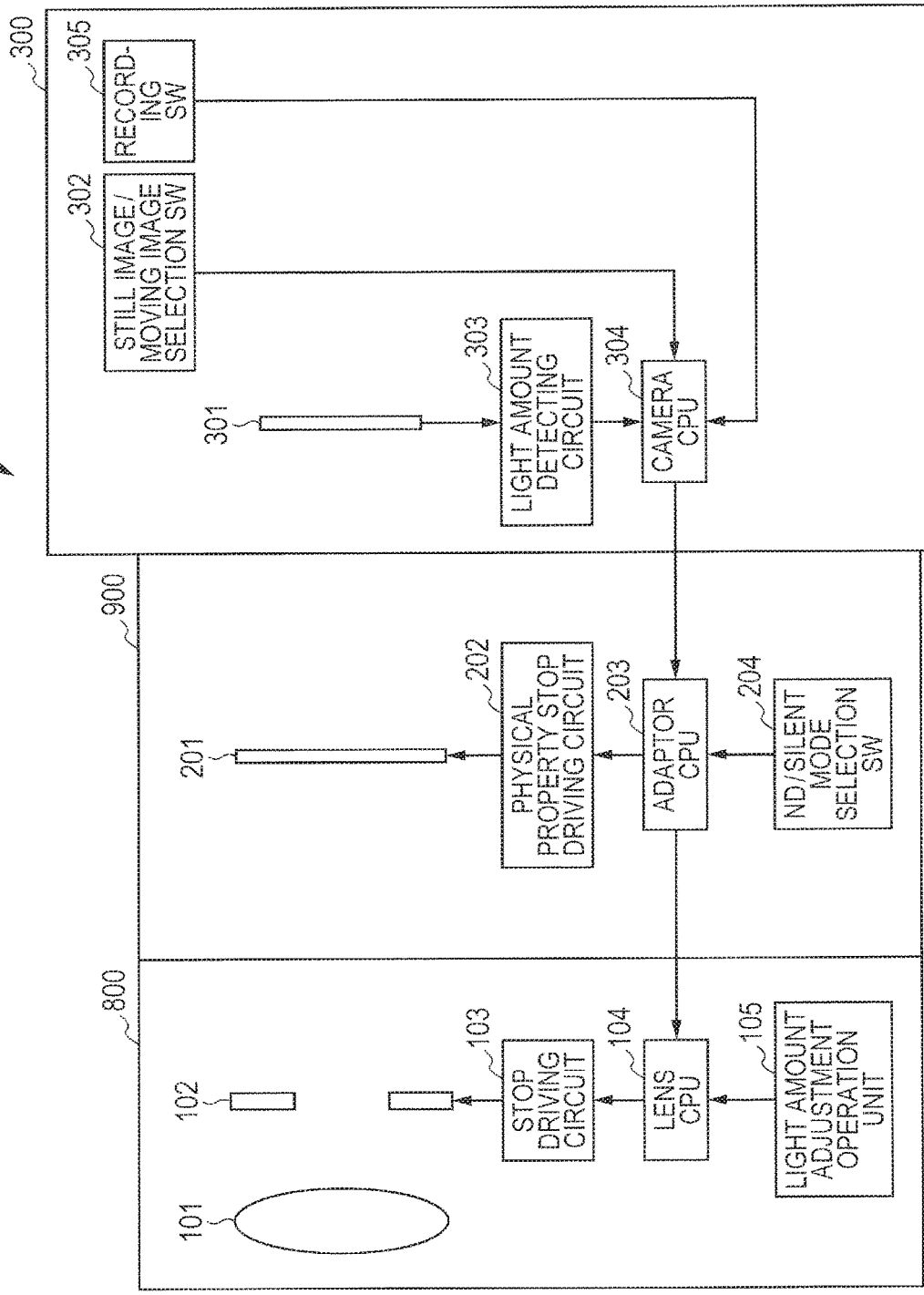
FIG. 11 is a schematic diagram of the camera system of the first embodiment which illustrates a modification of a light amount adjustment operation unit.

In the embodiment, the light amount adjustment operation unit 205 is illustrated as being included in the adaptor 200. Instead, however, a light amount adjustment operation unit 105 may be included in an interchangeable lens 800, as illustrated in FIG. 11. In this case, in step S15 in the operation flow in FIG. 4, the operating amount of the light amount adjustment operation unit 105 in the interchangeable lens 800 is checked.

2a) Silent Mode (Silent Image Pickup Mode)

Figure 5:
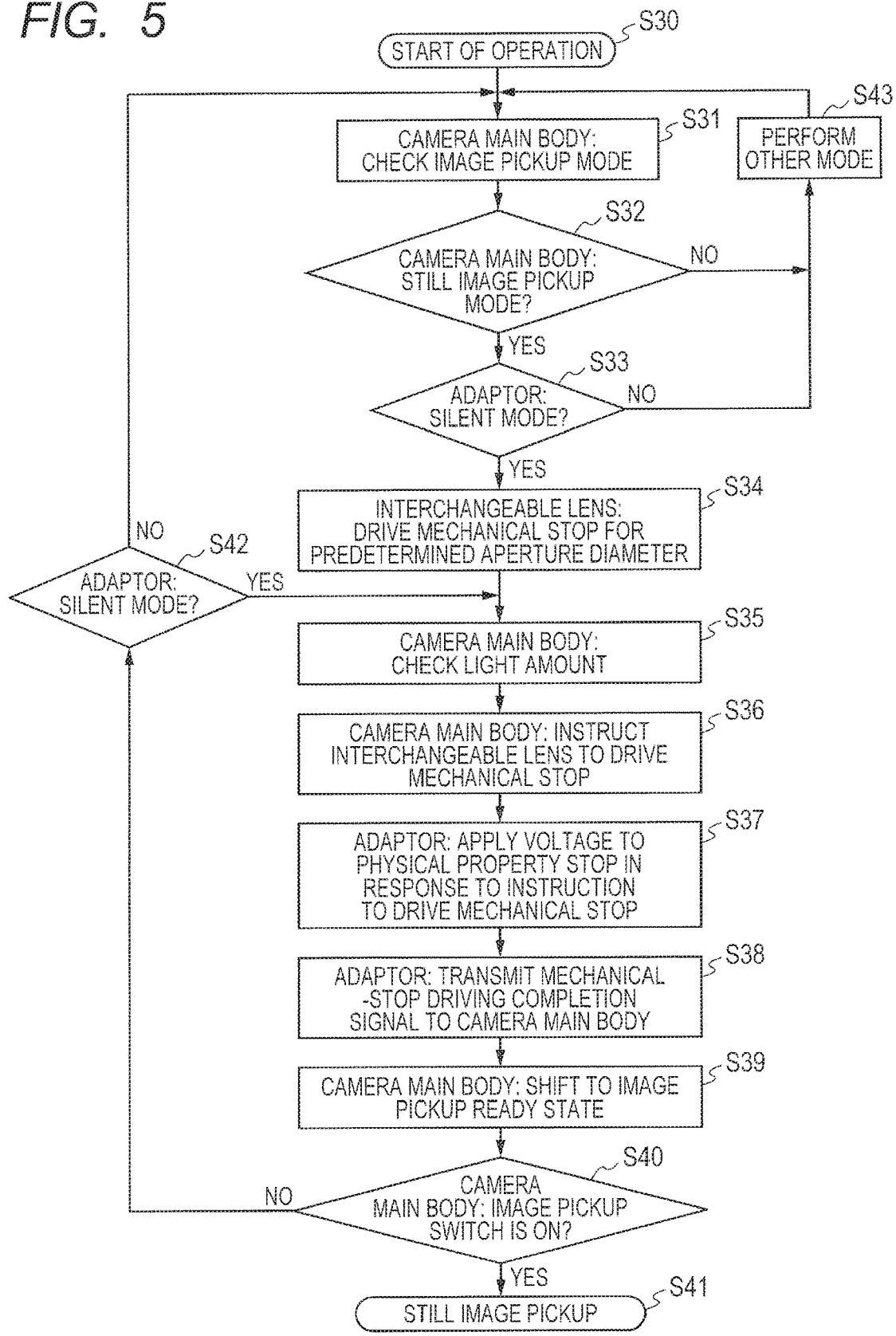
FIG. 5 is a flowchart of how the camera system of the first embodiment works to adjust an amount of light in a silent mode.

FIG. 5 illustrates a flow of how the camera system operates when the silent mode is selected using the ND/silent mode selection switch 204 in the adaptor 200.

First of all, as shown in step S30, operations of the interchangeable lens 100, the adaptor 200 and the camera main body 300 start. In step S31, the image pickup mode set in the camera main body 300 is checked. Thereafter, in step S32, it is confirmed whether the image pickup mode is the still image pickup mode in the camera main body 300. If the image pickup mode is not the still image pickup mode, the other mode is performed in step S43. If the image pickup mode is the still image pickup mode, the operation flow proceeds to step S33, where it is confirmed whether the silent mode is selected in the adaptor 200. If the silent mode is not selected, the other mode is performed in step S43.

If the silent mode is selected, the operation flow proceeds to step S34, where the mechanical stop 102 in the interchangeable lens 100 is driven at a predetermined aperture diameter. The predetermined aperture diameter is obtained by adding or subtracting predetermined steps (or no steps) to or from an aperture diameter corresponding to the f-number set in the camera main body 300. After that, in step S35, the amount of light which is incident on the image pickup element 301 is confirmed in the camera main body 300.

In step S36, based on the light amount confirmed in S35, a signal representing an instruction to drive the mechanical stop 102 is transmitted from the camera main body 300 to the interchangeable lens 100. Subsequently, in step S37, based on the signal from the camera main body 300 representing the instruction to drive the mechanical stop 102, a voltage to be applied to the physical property stop 201 is calculated in the adaptor CPU 203, and the voltage to the physical property stop 201 is applied based on the result of the calculation.

Next, in step S38, a false signal (completion signal) indicating the completion of the drive of the mechanical stop 102 is transmitted from the adaptor 200 to the camera main body 300. Thus, the mechanical stop 102 is actually not driven based on the signal from the camera main body 300.

Thereafter, in step S39, the camera main body shifts to an image pickup ready state. In step S40, it is checked whether the image pickup switch is ON or OFF. If the image pickup switch is ON, a still image pickup is performed. If the image pickup switch is OFF, it is confirmed again whether the image pickup mode is the silent mode in step 42. If the image pickup mode is not the silent mode, the operation flow proceeds to step 31. If the image pickup mode is the silent mode, the operation flow proceeds to step 35.

Once the silent mode is selected in the adaptor 200 through the above-discussed operation flow, to begin with, the mechanical stop 102 in the interchangeable lens 100 is controlled to make the mechanical stop 102 have a predetermined aperture diameter. Thereafter, based on the light amount detected (the result of the detection) by the light amount detector in the camera main body 300, the physical property stop 201 included in the adaptor 200 is controlled. When the silent mode is selected in the adaptor 200, the light amount can be adjusted with the drive of the mechanical stop 102 in the interchangeable lens 100 is stopped.

This makes it possible to prevent driving noise from being caused by the adjustment of the light amount when an image is picked up. This is useful when the user wishes to prevent the occurrence of the driving noise, for example when an image is picked up in a concert hall or the like.

3a) Moving Image Mode (Moving Image Pickup Mode)

Figure 6:
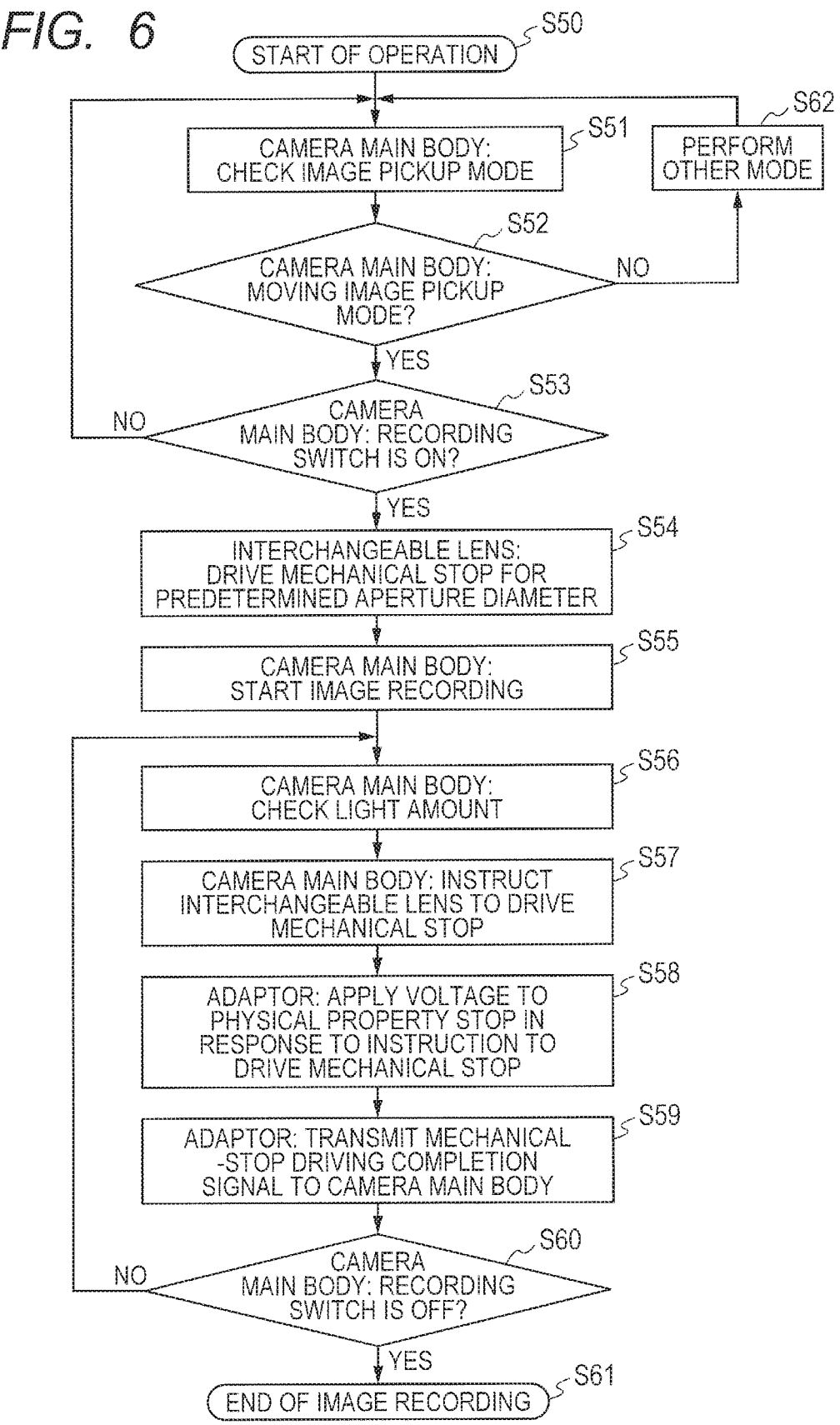
FIG. 6 is a flowchart of how the camera system of the first embodiment works to adjust an amount of light in a moving image mode.

FIG. 6 illustrates a flow of how the camera system operates when the moving image mode is selected using the still image/moving image selection switch (SW) 302 in the camera main body 300. In this embodiment, in the moving image pickup mode, the light amount is adjusted using the physical property stop 201 included in the adaptor 200 by prohibiting the drive of the mechanical stop 102 included in the interchangeable lens 100.

First of all, as shown in step S50, operations of the interchangeable lens 100, the adaptor 200 and the camera main body 300 start. In step S51, the image pickup mode set in the camera main body 300 is checked. Thereafter, in step S52, it is confirmed whether the image pickup mode is the moving image pickup mode in the camera main body 300.

If the image pickup mode is not the moving image pickup mode, the other mode is performed in step S62. If the image pickup mode is the moving image pickup mode, the operation flow proceeds to step S53, where it is confirmed whether the record switch is ON in the camera main body 300. If the record switch is not ON, the operation flow proceeds to step S62, where the other mode is performed.

If the record switch is ON, the operation flow proceeds to step S54. In step S54, the mechanical stop 102 in the interchangeable lens 100 is driven at a predetermined aperture diameter. The predetermined aperture diameter is obtained by adding or subtracting predetermined steps (or no steps) to or from an aperture diameter corresponding to the f-number set in the camera main body 300. In step S55, image recording starts in the camera main body 300. Thereafter, in step S56, the amount of light which is incident on the image pickup element 301 is confirmed in the camera main body 300.

In step S57, based on the light amount confirmed in S56, a signal representing an instruction to drive the mechanical stop 102 is transmitted from the camera main body 300 to the interchangeable lens 100. In step S58, based on the signal from the camera main body 300 representing the instruction to drive the mechanical stop 102, a voltage to be applied to the physical property stop 201 is calculated in the adaptor CPU 203, and the voltage is applied to the physical property stop 201 based on the result of the calculation. Next, in step S59, a false signal (completion signal) indicating the completion of the drive of the mechanical stop 102 is transmitted from the adaptor 200 to the camera main body 300. Thus, the mechanical stop 102 is actually not driven based on the signal from the camera main body 300.

Subsequently, in step S60, it is determined whether the record switch is OFF in the camera main body 300. If the record switch is OFF, the operation flow proceeds to step S61, where the image recording is finished. If the record switch is not OFF, the operation flow returns to step S56.

Once the moving image mode is selected in the camera main body through the above-discussed operation flow, immediately after the record switch is turned ON, the mechanical stop 102 in the interchangeable lens 100 is controlled to make the mechanical stop 102 have a predetermined aperture diameter. Thereafter, based on the light amount detected (the result of the detection) by the light amount detector in the camera main body 300, the physical property stop 201 included in the adaptor 200 is controlled. Thereby, while moving images are being recorded, the light amount can be adjusted with the drive of the mechanical stop 102 in the interchangeable lens 100 is stopped. This makes it possible to prevent driving noise from being caused by the adjustment of the light amount when moving images are being picked up. Thus, it is possible to prevent the driving noise from be recorded as sound to be recorded when the moving images are being picked up.

Effects of First Embodiment

In the camera system of the embodiment, the ND mode and the silent mode can be used according to the mode selection in the adaptor 200 even when the ND mode and the silent mode cannot be selected in the camera main body 300. In addition, in the camera system in which the camera main body 300 is not capable of recognizing the physical property stop in the adaptor 200, even when the moving image mode is selected, generation of the driving noise by the mechanical stop in the interchangeable lens can be prevented by controlling the physical property stop.

Second Embodiment

Based on the accompanying drawings, descriptions will be hereinbelow for a second embodiment of the present invention. In the first embodiment, the camera main body is not capable of recognizing the ND mode or the silent mode (that is to say, the camera main body has no ND/silent mode selection switch). In contrast, in the second embodiment, the camera main body is capable of recognizing the ND mode and the silent mode (that is to say, the camera main body has a ND/silent mode selection switch).

Figure 7:
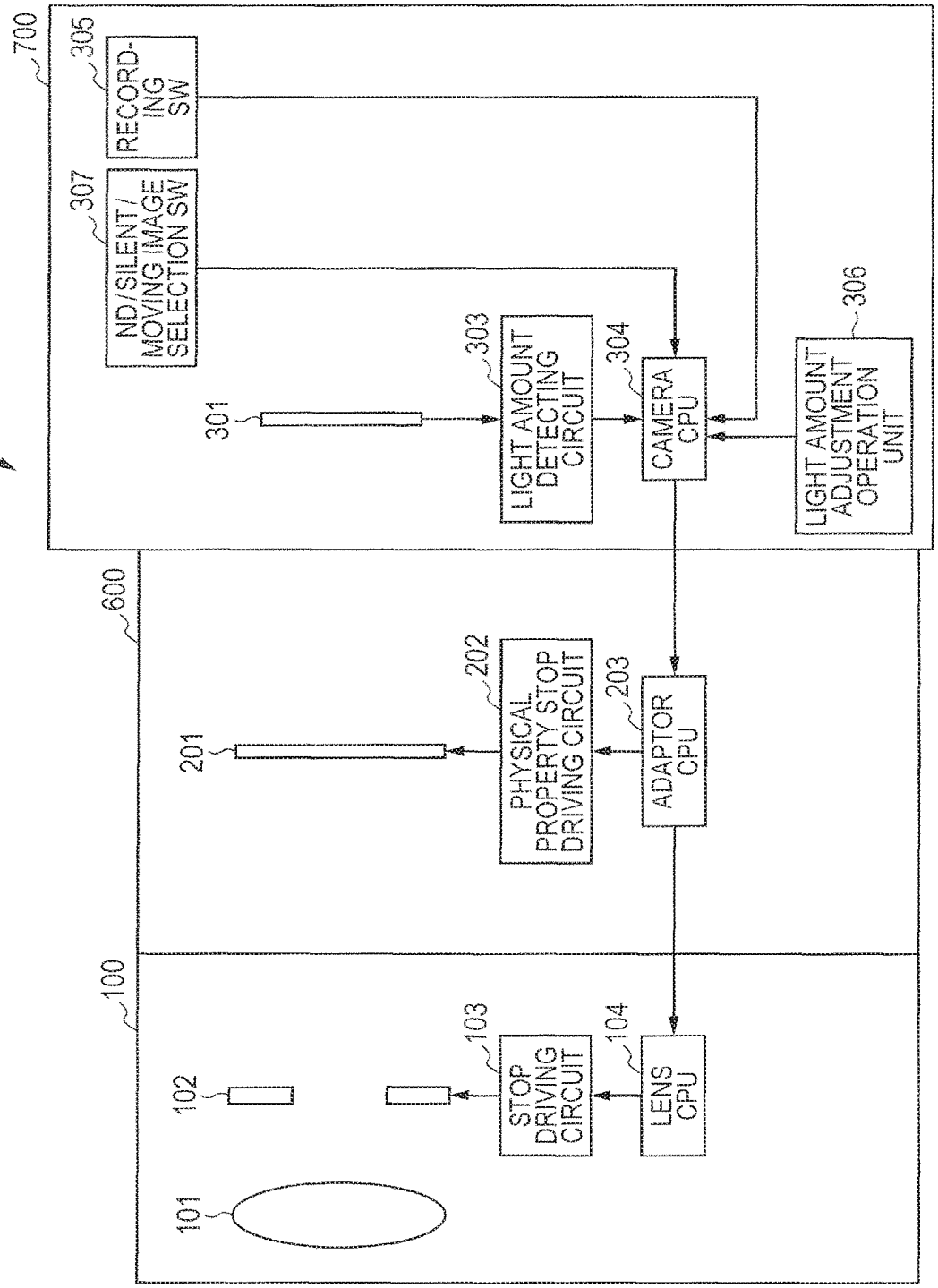
FIG. 7 is a schematic diagram of a camera system including an adaptor of a second embodiment.

FIG. 7 is a schematic diagram of a camera system including an adaptor of a second embodiment. The camera system 2 includes an interchangeable lens 100, a camera main body 700, as well as an adaptor 600 attachable between the interchangeable lens 100 and the camera main body 700. The interchangeable lens 100 is the same as that of the first embodiment. For this reason, descriptions for the interchangeable lens 100 will be omitted.

The adaptor 600 includes: a physical property stop 201 capable of changing the light transmittance based on a change in the physical property; a physical property stop driving circuit 202; and an adaptor CPU 203. The physical property stop 201 is the same as that of the first embodiment. For this reason, descriptions for the physical property stop 201 will be omitted.

In FIG. 7, the camera main body 700 includes an image pickup element 301, an ND/silent/moving image selection switch (SW) 307, a light amount detecting circuit 303, a camera CPU 304, a record switch 305, and a light amount adjustment operation unit 306. The ND/silent/moving image selection switch (SW) 307 for the user to select an image pickup mode is formed from a selection switch such as a dial switch. Using the ND/silent/moving image selection switch (SW) 307, the user can switch the image pickup mode among: a first image pickup mode (ND mode) for performing a first still image pickup; a second image pickup mode (silent mode) for performing a second still image pickup; and a third image pickup mode for performing a moving image pickup.

The record switch 305 is formed from a push button or the like. While the image pickup mode is set at the moving image pickup mode, the user can turn on and off the recording using the record switch 305. The light amount adjustment operation unit 306 is formed from a selection switch such as a dial switch. The user can adjust the light amount depending on the amount of turn of the light amount adjustment operation unit 306 when the user rotationally operates the light amount adjustment operation unit 306.

Descriptions will be hereinbelow provided for the ND mode, the silent mode and the moving image mode in this order. Incidentally, the mechanical stop 102 and the physical property stop 201 are the same as those of the first embodiment. For this reason, detailed descriptions will be omitted.

1b) ND Mode (ND Image Pickup Mode)

Figure 8:
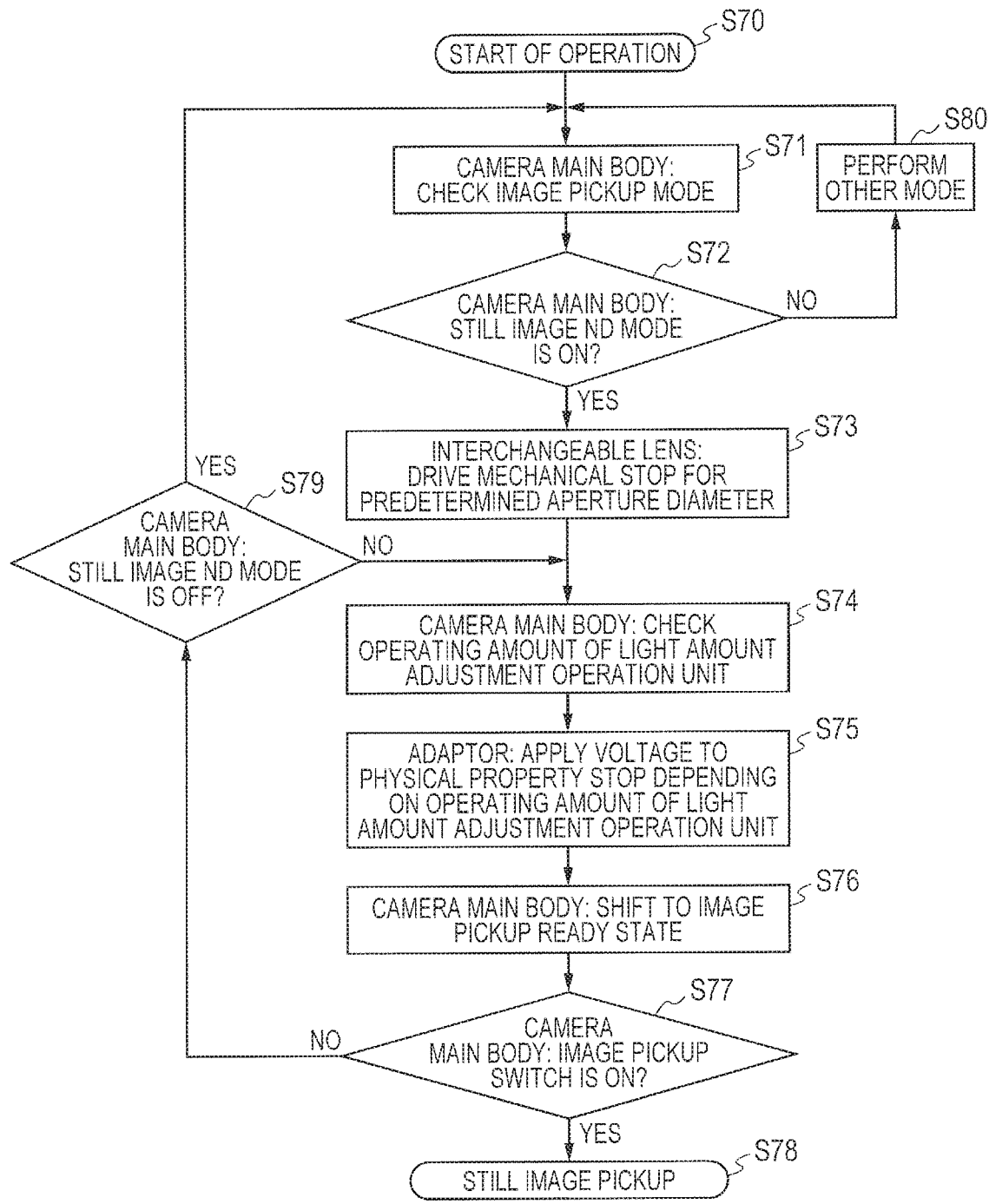
FIG. 8 is a flowchart of how the camera system of the second embodiment works to adjust an amount of light in an ND mode.

FIG. 8 illustrates a flow of how the camera system operates when the ND mode is selected using the ND/silent/moving image selection switch (SW) 307 in the camera main body 700.

First of all, as shown in step S70, operations the interchangeable lens 100, the adaptor 600 and the camera main body 700 start. In step S71, the image pickup mode set in the camera main body 700 is checked. Thereafter, in step S72, it is confirmed whether the ND mode is ON in the camera main body 700. If the ND mode is not ON, the other mode is performed in step S80. If the ND mode is ON, the operation flow proceeds to step S73.

In step S73, the mechanical stop 102 in the interchangeable lens 100 is driven at a predetermined aperture diameter. The predetermined aperture diameter is obtained by adding or subtracting predetermined steps (or no steps) to or from an aperture diameter corresponding to the f-number set in the camera main body 700.

Thereafter, in step S74, the operating amount of the light amount adjustment operation unit 306 included in the camera main body 700 is confirmed. In step S75, depending on the operating amount confirmed in step S74, a voltage to be applied to the physical property stop 201 is calculated in the adaptor CPU 203, and the voltage is applied to the physical property stop 201 based on the result of the calculation.

Next, in step S76, the camera main body shifts to an image pickup ready state. In step S77, it is confirmed whether the image pickup switch is ON or OFF. If the image pickup switch is ON, a still image pickup is performed. If the image pickup switch is OFF, it is confirmed again whether the ND mode is ON or OFF in step S79. If the ND mode is not ON, the operation flow proceeds to step S71. If the ND mode is ON, the operation flow proceeds to step S74.

Once the ND mode is selected in the camera main body 700 through the above-discussed operation flow, to begin with, the mechanical stop 102 in the interchangeable lens 100 is controlled to make the mechanical stop 102 have a predetermined aperture diameter. Thereafter, the physical property stop 201 is controlled depending on the operating amount of the light amount adjustment operation unit 306 included in the camera main body 700. When the ND mode is selected in the camera main body 700, the light amount can be adjusted with the aperture diameter of the mechanical stop 102 in the interchangeable lens 100 fixed. This makes it possible to adjust the light amount without changing the depth of field when an image is picked up.

Figure 12:
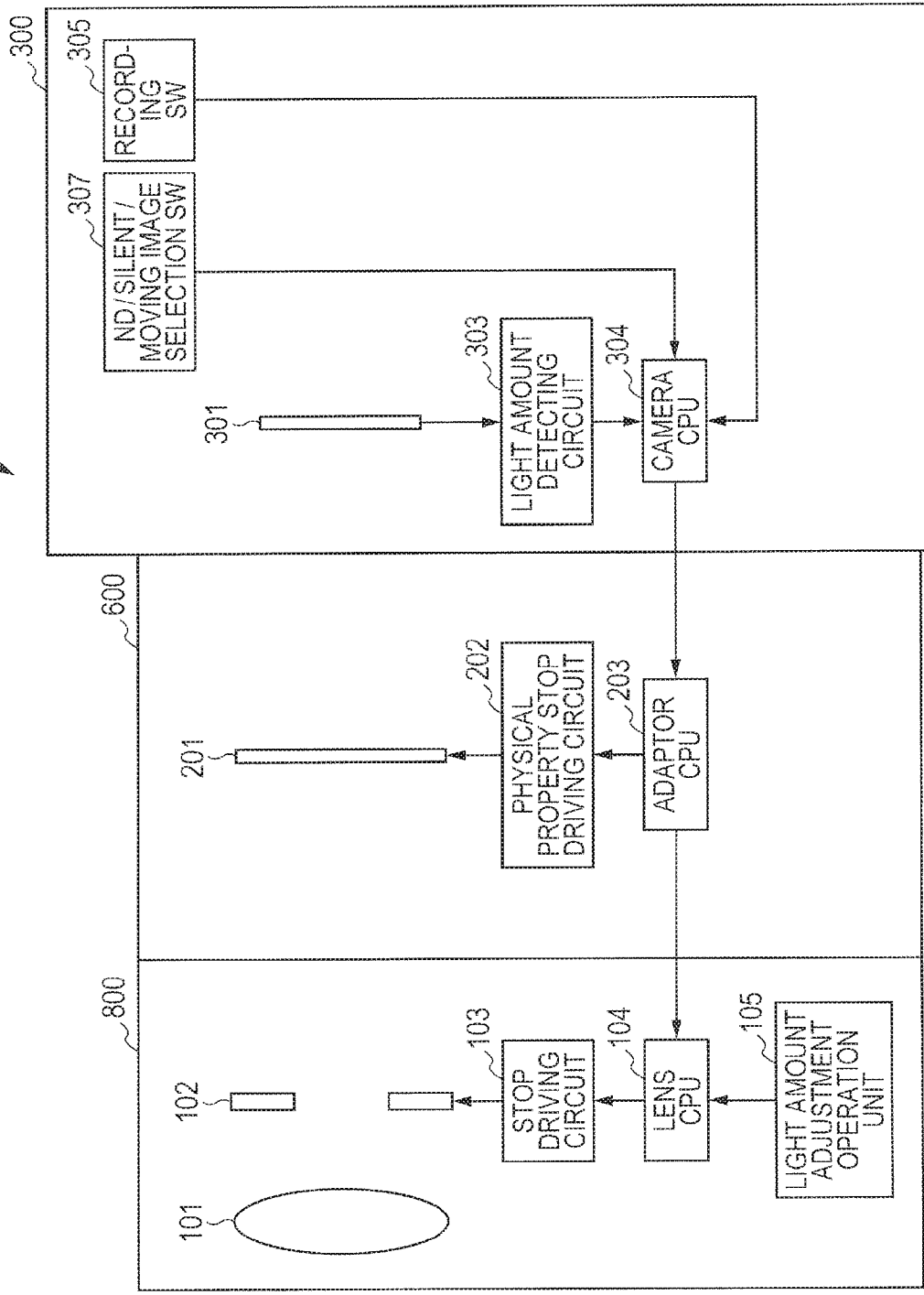
FIG. 12 is a schematic diagram of the camera system of the second embodiment which illustrates a modification of a light amount adjustment operation unit.

In the embodiment, the light amount adjustment operation unit is illustrated as being included in the camera main body. Instead, however, a light amount adjustment operation unit 105 may be included in an interchangeable lens 800, as illustrated in FIG. 12. In this case, in step S74 in the operation flow in FIG. 8, the operating amount of the light amount adjustment operation unit 105 in the interchangeable lens 800 is checked.

2b) Silent Mode (Silent Image Pickup Mode)

Figure 9:
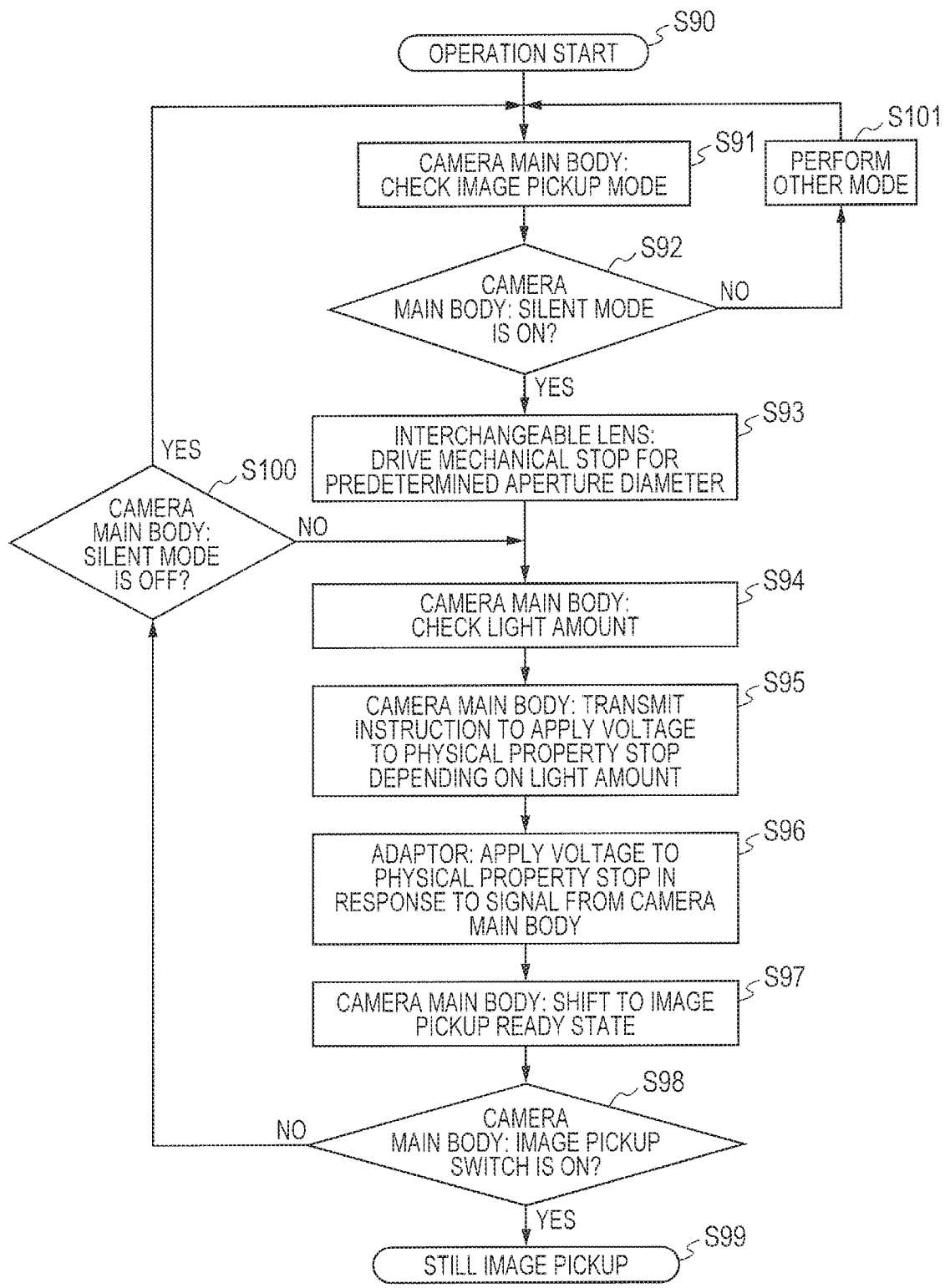
FIG. 9 is a flowchart of how the camera system of the second embodiment works to adjust an amount of light in a silent mode.

FIG. 9 illustrates a flow of how the camera system operates when the silent mode is selected using the ND/silent/moving image mode selection switch (SW) 307 in the camera main body 700.

First of all, as shown in step S90, operations of the interchangeable lens 100, the adaptor 600 and the camera main body 700 start. In step S91, the image pickup mode set in the camera main body 700 is checked. Thereafter, in step S92, it is confirmed whether the silent mode is ON in the camera main body 700. If the silent mode is not ON, the other mode is performed in step S101. If the silent mode is ON, the operation flow proceeds to step S93.

In step S93, the mechanical stop 102 in the interchangeable lens 100 is driven for a predetermined aperture diameter. The predetermined aperture diameter is obtained by adding or subtracting predetermined steps (or no steps) to or from an aperture diameter corresponding to the f-number set in the camera main body 700.

Thereafter, in step S94, the amount of light which is incident on the image pickup element 301 is confirmed in the camera main body 700. In step S95, based on the amount of light confirmed in S94, tan instruction signal to apply a voltage to the physical property stop 201 is transmitted from the camera main body 700 to the adaptor 600. In step S96, based on the instruction signal from the camera main body 700, a voltage to be applied to the physical property stop 201 is calculated in the adaptor CPU 203, and the voltage is applied to the physical property stop 201 based on the result of the calculation.

Next, in step S97, the camera main body shifts to an image pickup ready state. In step S98, it is confirmed whether the image pickup switch is ON or OFF. If the image pickup switch is ON, a still image pickup is performed. If the image pickup switch is OFF, it is confirmed again whether the silent mode is ON in step S100. If the silent mode is not ON, the operation flow proceeds to step S91. If the silent mode is ON, the operation flow proceeds to step S94.

Once the silent mode is selected in the camera main body 700 through the above-discussed operation flow, to begin with, the mechanical stop 102 in the interchangeable lens 100 is controlled to make the mechanical stop 102 have a predetermined aperture diameter. Thereafter, based on the light amount confirmed by the camera main body 700, the physical property stop 201 included in the adaptor 600 is controlled. Thereby, when the silent mode is selected in the camera main body 700, the light amount can be adjusted with the drive of the mechanical stop 102 in the interchangeable lens 100 is stopped.

This makes it possible to prevent driving noise from being caused by the adjustment of the light amount when an image is picked up. This is useful when the user wishes to suppress the occurrence of the driving noise, for example when an image is picked up in a concert hall or the like.

3b) Moving Image Mode (Moving Image Pickup Mode)

Figure 10:
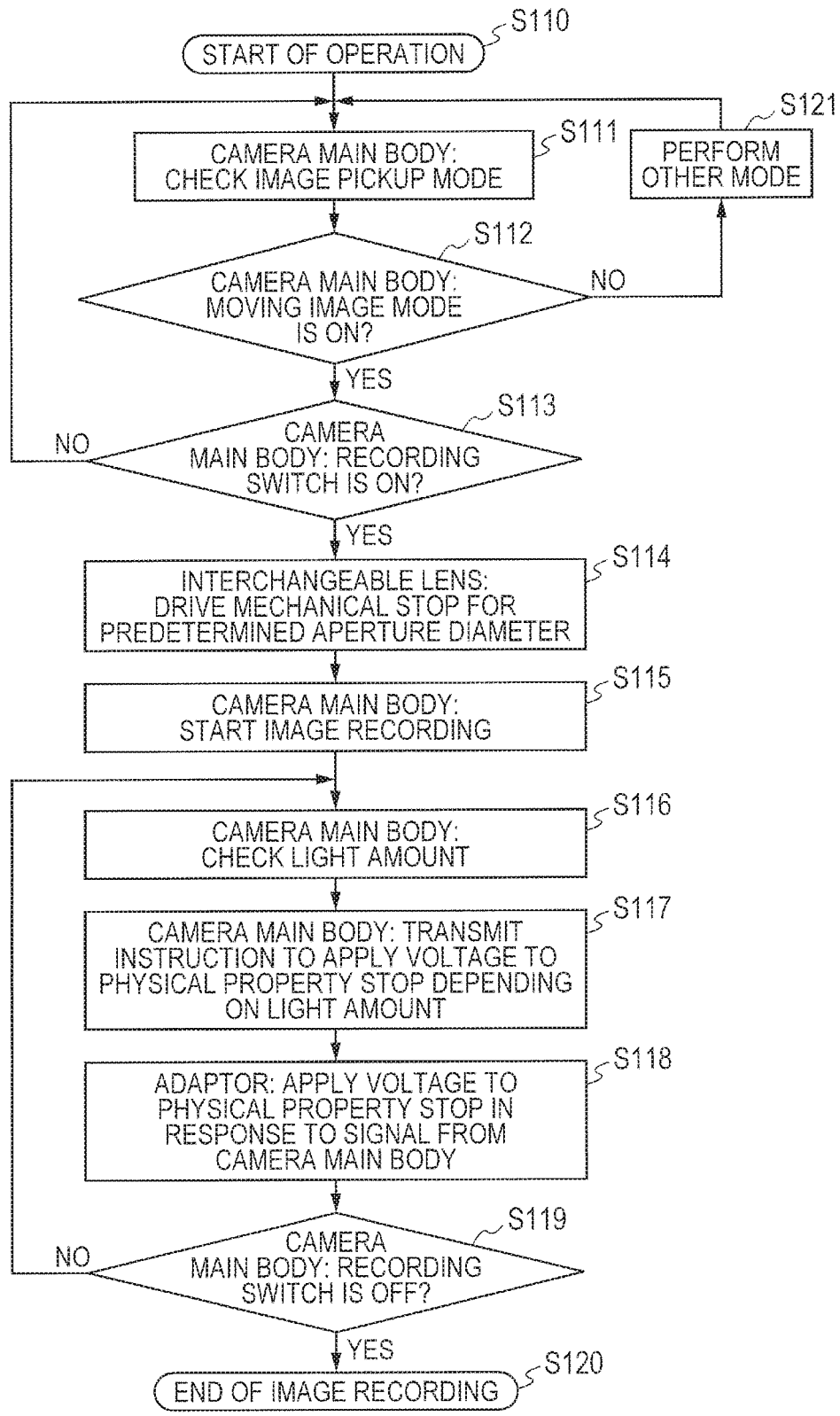
FIG. 10 is a flowchart of how the camera system of the second embodiment works to adjust an amount of light in a moving image mode.

FIG. 10 illustrates a flow of how the camera system operates when the moving image mode is selected using the ND/silent/moving image selection switch (SW) 307 in the camera main body 700.

First of all, as shown in step S110, operations of the interchangeable lens 100, the adaptor 600 and the camera main body 700 start. In step S111, the image pickup mode set in the camera main body 700 is checked. Thereafter, in step S112, it is confirmed whether the moving image mode is ON in the camera main body 700. If the moving image mode is not ON, the other mode is performed in step S121. If the moving image mode is ON, the operation flow proceeds to step S113, where it is confirmed whether the record switch is ON in the camera main body 700. If the record switch is not ON, the operation flow returns to step S111. If the record switch is ON, the operation flow proceeds to step S114.

In step S114, the mechanical stop 102 in the interchangeable lens 100 is driven for a predetermined aperture diameter. The predetermined aperture diameter is obtained by adding or subtracting predetermined steps (or no steps) to or from an aperture diameter corresponding to the f-number set in the camera main body 700. In step S115, image recording starts in the camera main body 700. Thereafter, in step S116, the amount of light which is incident on the image pickup element 301 is confirmed in the camera main body 700.

In step S117, based on the light amount confirmed in S116, an instruction signal to apply a voltage to the physical property stop 201 is transmitted from the camera main body 700 to the adaptor 600. In step S118, based on the instruction signal from the camera main body 700, a voltage to be applied to the physical property stop 201 is calculated in the adaptor CPU 203, and the voltage is applied to the physical property stop 201 based on the result of the calculation.

Next, in step S119, it is determined whether the record switch is OFF in the camera main body 700. If the record switch is OFF, the operation flow proceeds to step S120, where the image recording is finished. If the record switch is not OFF, the operation flow returns to step S116.

Once the moving image mode is selected in the camera main body 700 through the above-discussed operation flow, immediately after the record switch is turned ON, the mechanical stop 102 in the interchangeable lens 100 is controlled to make the mechanical stop 102 have a predetermined aperture diameter. Thereafter, based on the light amount detected (the result of the detection) by the light amount detector in the camera main body 700, the physical property stop 201 included in the adaptor 600 is controlled. Thereby, while moving images are being recorded, the light amount can be adjusted with the drive of the mechanical stop 102 in the interchangeable lens 100 is stopped. This makes it possible to prevent driving noise from being caused by the adjustment of the light amount when moving images are being picked up. Thus, it is possible to prevent the driving noise from being recorded as sound to be recorded when the moving images are being picked up.

Effects of Second Embodiment

The second embodiment can prevent driving noise from being caused by the mechanical stop in the interchangeable lens by controlling the physical property stop in the adaptor in a case where the camera main body is capable of selecting any one of the ND image pickup mode and the silent image pickup mode as the still image pickup modes, and the moving image pickup mode.

(Modifications)

Although the foregoing descriptions have been provided for the preferable embodiments of the present invention, the present invention is not limited to these embodiments. The present invention may be variously modified and changed within a scope of the gist of the present invention.

(Modification 1)

Figure 13:
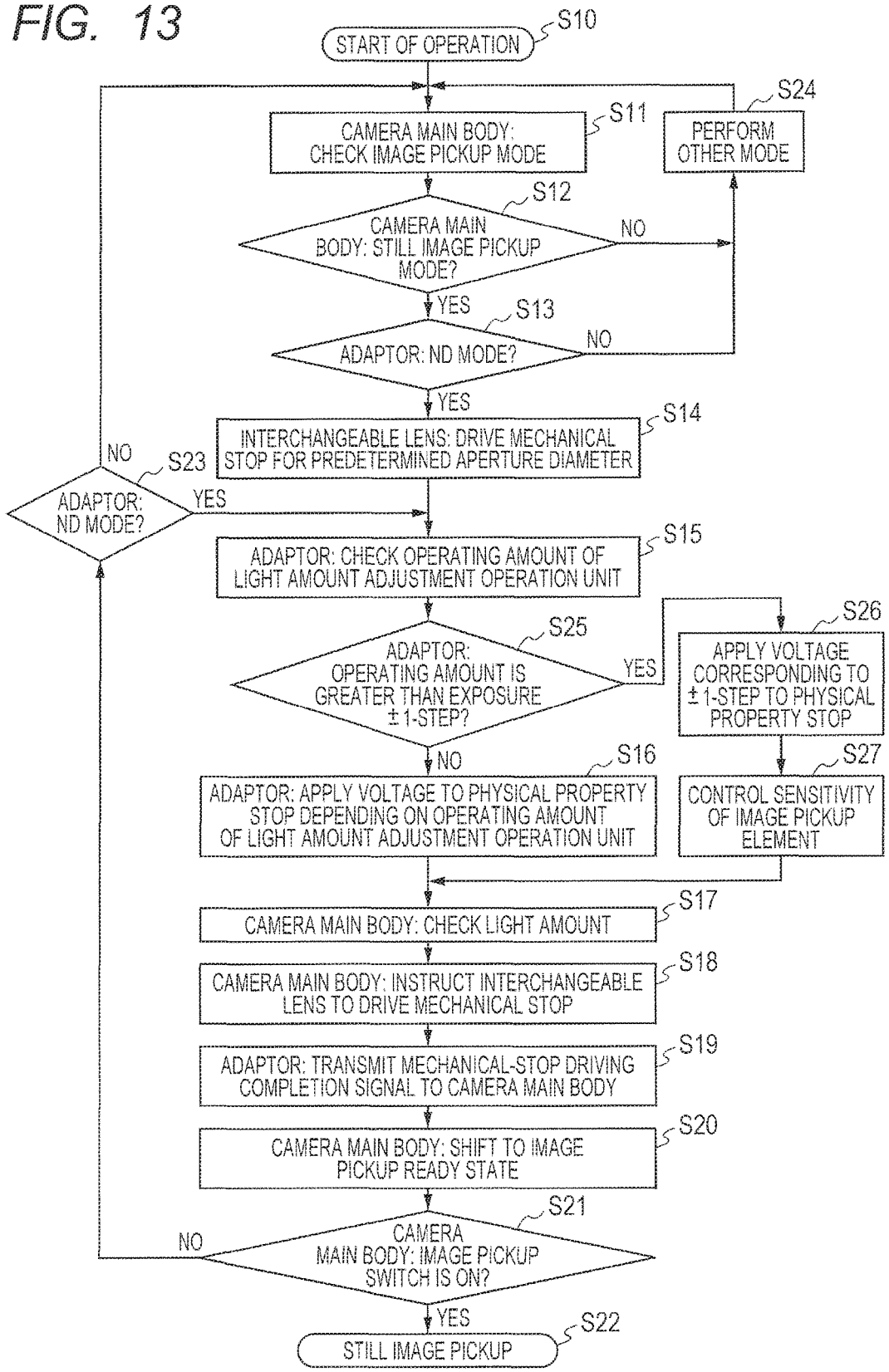
FIG. 13 is an operation flowchart illustrating a first modification of a moving image pickup.

The foregoing descriptions have been provided for the embodiment in which the light amount is adjusted using only the physical property stop in the adaptor with the drive of the mechanical stop in the interchangeable lens is stopped. The present invention is not limited to this embodiment. For example, as illustrated in FIG. 13 (a modification of the operation flow in FIG. 4 for the first embodiment), the amount of light may be adjusted such that: it is confirmed how many light amount steps the voltage to be applied to the physical property stop corresponds to; and if the number of light amount steps exceeds a predetermined number (±1 step in the case illustrated in FIG. 13), the sensitivity of the image pickup element in the camera main body may be changed.

This makes it possible to appropriately adjust the light amount even in a case where the light amount needs to be adjusted outside an applicable range (beyond a controllable range) even if the physical property stop is used. In addition, since even beyond the applicable range, the physical property stop can be used by steps to which the physical property stop is applicable, the increase in the sensitivity of the image pickup element may be only as much as necessary. For this reason, it is possible to suppress the influence of noise which is caused by the increase in the sensitivity.

(Modification 2)

Although the foregoing embodiments use the electrochromic element as the physical property stop, the present invention may use an element using a different chemical reaction, such as a liquid crystal element.

(Modification 3)

In the above embodiments, the camera system can select the image pickup mode from the ND image pickup mode, the silent image pickup mode and the moving image pickup mode with the physical property stop included in the adaptor. However, the camera system may be configured to be able to select the image pickup mode from the ND image pickup mode, the silent image pickup mode and the moving image pickup mode with the physical property stop included in the camera main body or the interchangeable lens. Otherwise, the camera system may be configured to be able to select the image pickup mode from the ND image pickup mode, the silent image pickup mode and the moving image pickup mode with the physical property stop included in the camera main body or the interchangeable lens but without including the adaptor.

To put it specifically, the camera system may include: a first light amount adjustment unit configured to change the area of the aperture which allows the image pickup light to pass through; a second light amount adjustment unit configured to change the transmittance of the image pickup light depending on the change in the physical property; an image pickup element; and a controller configured to control the second light amount adjustment unit. Incidentally, the image pickup element of this modification is provided in the camera main body, and the first light amount adjustment unit of this modification is provided in the interchangeable lens.

Furthermore, the camera system may be configured such that while the camera system is set in the first image pickup mode for performing the first still image pickup, the controller may control the transmittance in the second light amount adjustment unit depending on the operating amount of the operation unit by the user in order to adjust the light amount. Moreover, the camera system may be configured such that: the instruction to drive the first light amount adjustment unit, which is transmitted from the camera main body toward the interchangeable lens, is converted into a drive completion signal; and the drive completion signal is transmitted toward the camera main body.

Besides, the selection switch configured to select one of the image pickup modes may be included in any one of the camera main body, the interchangeable lens and the adaptor which form the camera system. The image pickup modes to be selectable using the selection switch, and the control to be performed by the controller in a selected image pickup mode may be configured in the same way as those of the foregoing embodiments.

(Modification 4)

Although in the foregoing embodiments, the selection switch (SW) configured to select one from the ND image pickup mode and the silent image pickup mode is provided in the adaptor or the camera main body, the selection switch (SW) may be provided in the interchangeable lens.

(Modification 5)

Figure 14:
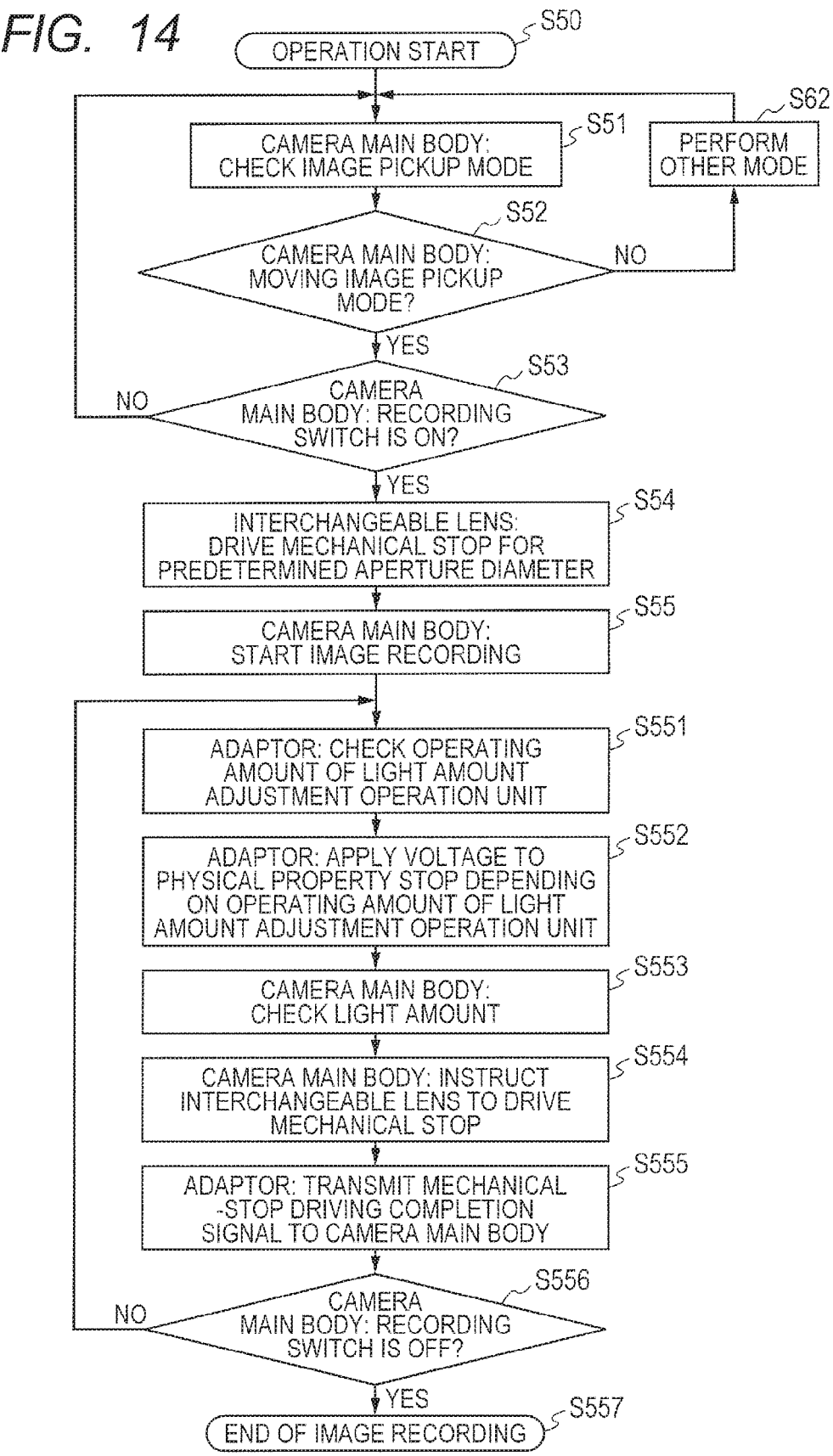
FIG. 14 is an operation flowchart illustrating a second modification of a moving image pickup.

Referring to FIG. 14, descriptions will be provided for a modification of the control for the moving image pickup, which is illustrated in FIG. 6. In Steps S50 through S55, the same controls as those illustrated in FIG. 6 are performed. In step S551, the operating amount of the light amount adjustment operation unit 205 included in the adaptor 200 is detected (confirmed, checked). Thereafter, in step S552, depending on the operating amount confirmed in step S551, the amount of voltage to be applied to the physical property stop 201 is calculated in the adaptor CPU 203, and the voltage is applied to the physical property stop 201 based on the result of the calculation.

Subsequently, in step S553, the amount of light which is incident on the image pickup element 301 is confirmed in the camera main body 300. In step S554, based on the light amount confirmed in step S553, an instruction to drive the mechanical stop 102 is transmitted from the camera main body 300 to the interchangeable lens 100. However, the mechanical stop 102 is not driven. The reason why the mechanical stop 102 is not driven is that there is a step as follows. To put it specifically, the operation flow includes step S555 in which a false signal (completion signal) indicating the completion of the drive of the mechanical stop 102 is transmitted from the adaptor 200 to the camera main body 300. This step is achieved by: converting the instruction to drive the mechanical stop 102 into the drive completion signal; and transmitting the drive completion signal to the camera main body 300. Thus, the mechanical stop 102 is actually not driven based on the signal from the camera main body 300.

In step S556, it is confirmed whether images are being recorded in the camera main body. If images are being recorded, the operation flow returns to step S551. If images are not being recorded, the control illustrated in FIG. 14 is finished in step S557.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2016-079396, filed Apr. 12, 2016, and No. 2017-040987, filed Mar. 3, 2017, which are hereby incorporated by reference herein in their entirety.

What is claimed is:

1. An adaptor attachable between an interchangeable lens and a camera main body, the interchangeable lens including a first light amount adjustment stop capable of changing a passing area of image pickup light, the camera main body including an image pickup element, the adaptor comprising:
   a second light amount adjustment stop capable of changing transmittance of the image pickup light by using a change in a physical property; and
   a controller configured to control the second light amount adjustment stop, wherein
   in a moving image pickup mode, the controller controls the transmittance in the second light amount adjustment stop depending on an operating amount of an operation unit by a user to adjust an amount of light, or in response to an instruction, transmitted toward the interchangeable lens from the camera main body, to drive the first light amount adjustment stop,
   in the moving image pickup mode, the controller converts the instruction, transmitted toward the interchangeable lens from the camera main body, to drive the first light amount adjustment stop, into a drive completion signal, and transmits the drive completion signal to the camera main body, and
   in the moving image pickup mode, the first light amount adjustment stop is not driven.

2. The adaptor according to claim 1, further comprising a selection switch configured to select the moving image pickup mode or a first still image pickup mode.

3. The adaptor according to claim 2, wherein
   the selection switch is capable of selecting a second still image pickup mode, and
   in the second still image pickup mode, the controller controls the transmittance in the second light amount adjustment stop depending on an amount of light detected by a light amount detector.

4. The adaptor according to claim 3, wherein in the second still image pickup mode, depending on the amount of light detected by the light amount detector, the controller
controls the transmittance in the second light amount adjustment stop in response to the instruction, transmitted toward the interchangeable lens from the camera main body, to drive the first light amount adjustment stop, and
converts the drive instruction into the drive completion signal, and transmits the drive completion signal to the camera main body.

5. The adaptor according to claim 2, wherein
when the selection switch selects the moving image pickup mode, the controller controls the transmittance in the second light amount adjustment stop depending on the amount of light detected by the light amount detector.

6. The adaptor according to claim 5, wherein in the moving image pickup mode, depending on the amount of light detected by the light amount detector, the controller
controls the transmittance in the second light amount adjustment stop in response to the instruction, transmitted toward the interchangeable lens from the camera main body, to drive the first light amount adjustment stop, and
converts the drive instruction into the drive completion signal, and transmits the drive completion signal to the camera main body.

7. The adaptor according to claim 1, further comprising the operation unit.

8. A camera system comprising:
an interchangeable lens including a first light amount adjustment stop configured to change a passing area of image pickup light;
a camera main body including an image pickup element; and
an adaptor attachable between the interchangeable lens and the camera main body,
wherein the adaptor comprises:
a second light amount adjustment stop capable of changing transmittance of the image pickup light by using a change in a physical property, and
a controller configured to control the second light amount adjustment stop,
wherein,
in a moving image pickup mode, the controller controls the transmittance in the second light amount adjustment stop depending on an operating amount of an operation unit by a user to adjust an amount of light, or in response to an instruction, transmitted toward the interchangeable lens from the camera main body, to drive the first light amount adjustment stop,
in the moving image pickup mode, the controller converts the instruction, transmitted toward the interchangeable lens from the camera main body, to drive the first light amount adjustment stop, into a drive completion signal, and transmits the drive completion signal to the camera main body, and
in the moving image pickup mode, the first light amount adjustment stop is not driven.

9. The camera system according to claim 8, wherein a method of controlling the first light amount adjustment stop and the second light amount adjustment stop is changed depending on the image pickup mode selected from a plurality of image pickup modes.

10. The camera system according to claim 8, wherein when the transmittance controlled in the second light amount adjustment stop is beyond a control range, a sensitivity of the image pickup element is controlled.

11. The camera system according to claim 8, wherein the camera main body comprises a selection switch configured to select the moving image pickup mode or a first still image pickup mode.

12. The camera system according to claim 8, wherein the camera main body comprises a light amount detector.

13. The camera system according to claim 8, wherein any one of the adaptor, the camera main body and the interchangeable lens comprises the operation unit.

14. The camera system according to claim 8, wherein
the passing area in the first light amount adjustment stop is changeable by the user in order to determine a depth of field, and
with the depth of field determined, the operating amount of the operation unit is detected.

* * * * *